United States Patent [19]

Grossman et al.

[11] 4,163,689
[45] Aug. 7, 1979

[54] VENTED NUCLEAR FUEL ELEMENT

[75] Inventors: Leonard N. Grossman, Livermore; Alexis I. Kaznoff, Castro Valley, both of Calif.

[73] Assignee: The United States of America as represented by the United States Department of Energy, Washington, D.C.

[21] Appl. No.: 512,823

[22] Filed: Dec. 3, 1965

[51] Int. Cl.² .................................................. G21C 3/02
[52] U.S. Cl. ...................................... 176/68; 136/202
[58] Field of Search ...................... 176/37, 68, 79, 90, 176/76, 78; 310/3, 4; 136/202

[56] References Cited
U.S. PATENT DOCUMENTS
3,238,105    3/1966    McNelly ............................... 176/37

Primary Examiner—Peter A. Nelson
Attorney, Agent, or Firm—Dean E. Carlson; R. S. Gaither

[57] ABSTRACT

A nuclear fuel cell for use in a thermionic nuclear reactor in which a small conduit extends from the outside surface of the emitter to the center of the fuel mass of the emitter body to permit escape of volatile and gaseous fission products collected in the center thereof by virtue of molecular migration of the gases to the hotter region of the fuel.

5 Claims, 3 Drawing Figures

VENTED NUCLEAR FUEL ELEMENT

This invention relates to nuclear reactors and in particular to fuel for, and fission gas venting of a thermionic or similar fuel element.

In thermionic nuclear reactors, the generation of gases upon the fission of the fissile fuel presents at least a two-fold problem; first, particular fission product gases such as xenon and krypton have such large neutron absorption cross sections so that if they remain in the reactor core in the neutron flux an appreciable number of neutrons are lost from the fission process effectively reducing the reactor efficiency and possibly reducing reactivity to below critical; and second, fission product gases or other volatile products may be sufficient in amount to create excessive pressure to cause the fuel container to bulge and deform. Since, in a thermionic reactor or any other high temperature reactor the fuel container forms the emitter portion of the thermionic cell, and since the spacing between the emitter and collector portions of the cell are very small, being of the order of hundredths to thousandths of an inch and very critical, any bulging or changing of shape of the emitter may be highly detrimetal to reactor operation and/or thermionic performance of the fuel cell or element. The device of the present invention eliminates these problems by taking advantage of phenomena associated with high temperature operation of nuclear fuels to remove and conduct away from the fuel cell or rod the various gases and volatile products generated during the fission process. Where other venting methods merely permit the gaseous and volatile products permeate the fissile fuel, the present invention provides an arrangement promoting gas and vapor migration to form an accumulated pocket of gas and to remove it from the fuel soon after it is generated.

It is, therefore, an object of this invention to provide a venting device for a thermionic nuclear fuel cell or a high temperature fuel element whereby deformation of the cell cladding caused by fission gas pressure is eliminated.

It is a further object of this invention to provide a venting device for a nuclear reactor fuel element whereby fission product gases having a high neutron absorption cross section are readily removed from the fuel element.

It is another object of this invention to provide a venting device for a nuclear reactor fuel element providing for the directional migration of fission product gases to be accumulated and removed from the reactor.

Other and more particular objects of this invention will be manifest upon study of the following detailed description when taken together with the accompanying drawing in which.

The device of this invention is adaptable for use in any solid fissile fuel element for a nuclear reactor; however, it is particularly adaptable for use in a Thermionic Nuclear Reactor as described in copending application Ser. No. 347,320 filed Feb. 25, 1964.

In fuel elements operating at very high temperatures in the range of 1600° C. to 2500° C., i.e., at temperatures just below the melting point of the fuel, e.g., uranium oxide or the like, the gaseous and volatile fission products tend to migrate within the fuel mass toward areas of higher temperature. In nuclear fuel bodies which do not provide for central cooling, the temperature of the fuel increases as the center of the mass, generally corresponding to the center of gravity of the fuel, is approached because of the bulk heat source nature of the fuel. This migration occurs in uranium oxide and other uranium-plutonium bearing fuels having high volubility and characteristics. It has now been found that a void is formed in the center of such a solid fuel body into which the gaseous and volatile fission products migrate and collect. More specifically, at temperatures above about 1600° C. in $UO_2$ for example, nucleation of gases into bubbles or "pores" occurs, which "pores" or bubbles migrate along the thermal gradient to the region of highest temperature. Accordingly, the migratory bubbles accumulate at the hottest part of the fuel mass, i.e., the center in solid cylindrical, prismatic or other solid rod shape to form a void of significantly larger size than the individual bubbles. Thus, there is produced not only a temperature gradient radially decreasing from the center of the fuel mass but also a gaseous pressure gradient which pressure is higher in the center of the fuel mass than at the outer margins created by the migratory tendency of the gas and gas-like molecules. Thus, it can be seen that a port or vent in the fuel element cladding which communicates merely with the space between the cladding and fuel body will not be sufficient to remove all gaseous and volatile fission products due to the tendency of the gas molecules to flow away from the cooler cladding. In practice, such an arrangement would require the gases not only to filter through the fuel itself but also to overcome the effective back pressure due to migration of the gas molecules away from the cladding. It is this phenomena of migration that is utilized by the fuel vent of this invention to effectively remove all gaseous and volatile fission products as soon as possible after they are generated as set forth hereinafter.

Figure 1:
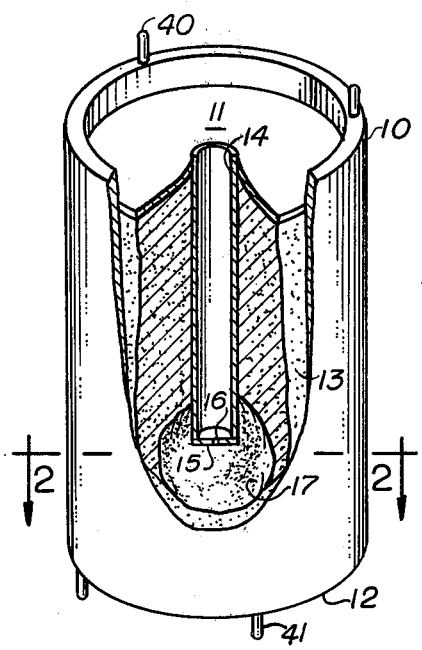
FIG. 1 is a partial cut-away view of a typical thermionic fuel cell emitter showing the fuel element vent as installed and in operation.

Referring to FIG. 1, there is disclosed a typical emitter of a nuclear fuel thermionic cell utilizing this invention comprising an outer cladding 10 of a material suitable for high temperature thermionic reactor use as an emitting surface for electrons having end caps 11 and 12 and containing fissile fuel mass or body 13. The fission product vent of this invention as utilized in the above fuel cell, comprises conduit 14 penetrating the center of end cap 11 and affixed and sealed thereto as by welding, brazing or the like and extending axially to the center of fissile fuel body 13. Proximate the lower end of conduit 14 distal the end affixed to end cap 11 is vent cap 15 affixed as by welding, brazing or the like and having vent hole 16 in the center thereof and of a diameter smaller than the inside diameter of conduit 14. Vent cap 15 may also be formed by swaging or the like, to reduce the end of conduit 14 to a smaller diameter equal to the diameter of vent hole 16. It will be appreciated that such fuel cells, when disposed in a thermionic nuclear reactor, may be coupled to an exterior gas disposal system (not shown) by means of appropriate conduits or other equivalent gas transport fixtures therein, which connect to conduits 14.

Also when used in a thermionic nuclear fuel element comprising a plurality of such individual thermionic cells, such as those described in copending application Ser. No. 347,320, supra, upper pins 40 and lower pins 41 are provided on end caps 11 and 12 respectively of the emitter of the instant invention to maintain the emitter in a spaced apart relationship from adjacent collector surfaces (not shown). Such pins or other like connectors provide electrical contact between adjacent emitters (not shown) and collectors (not shown) all as described in the aforesaid copending application.

Although a central void will form during reactor operation, due to phenomena discussed above, it is preferable during assembly of the fuel cell to leave or form a small void space 17 circumjacent end cap 15 and vent hole 16 to prevent plugging of said hole 16 by any loose granules of the fissile fuel. Typical fuel bodies 13 can be fabricated by compaction of granular $UO_2$ or similar ceramic fissile materials by conventional means. In any event, after a sufficient period of operation in which fission product gases and volatiles have migrated toward the center of the fuel cell, a natural void 17 will be formed and act as a plenum for collection of said gases and volatiles in the event a central void is not initially provided.

Figure 2:
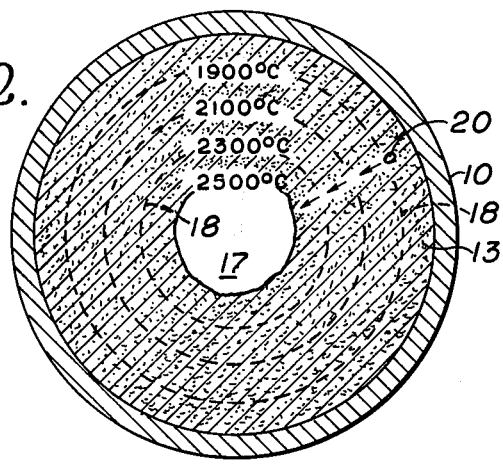
FIG. 2 is a lateral section through the typical fuel cell emitter of FIG. 1 showing typical isothermal lines during full power operation.

Referring to FIG. 2, during operation of a typical fuel cell containing $UO_2$, a typical fissile fuel in a typical thermionic nuclear reactor, a temperature gradient increasing radially toward the center of the fuel mass 13 will develop due to the heat generation within the fuel coupled with the poor thermal conductivity of the fuel. Isothermal lines 18 are illustrative of the typical temperatures found within the fuel mass. A gas bubble 20 generated near the periphery of the fuel mass will migrate to the higher temperature regions in the direction of the arrows until it reaches central void 17. Due to greater pressure of gases within the fuel cell, they will then pass through hole 16 (FIGS. 1 and 3) in conduit end cap 15, through conduit 14 and out to the space between the collector and emitter or to other conduit systems (not shown) for disposal outside the reactor.

Figure 3:
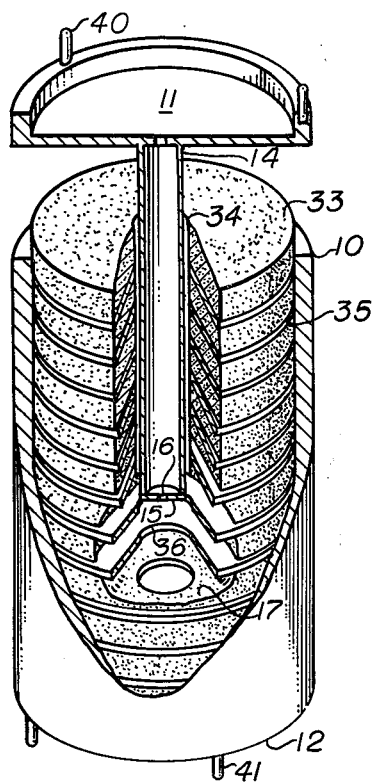
FIG. 3 is a partial cut-away view of another embodiment of the venting system of this invention wherein are incorporated means for reducing central temperature of the fuel mass.

Although molten fuel is sometimes considered desirable from the standpoint of fission gas release in connection with various prior art nuclear fuel elements, it must be noted that the migration phenomenon utilized in the present invention operates only when the fuel is below its melting point; otherwise the molten fuel will reacto to forces of gravity or acceleration and may penetrate into the vent tube 14. The maximum gas bubble migration tendency is produced with the establishment of the greatest differential temperature gradients and as the maximum central temperature approaches the melting point of the fuel material. To reduce the possibility of inadvertently operating at temperatures above the melting point of the fuel, FIG. 3 illustrates an embodiment wherein the fissile fuel is fabricated in the form of wafers 33 having a central hole 34 stacked with metal disks 35 having central hole 36 sandwiched between each of said wafers. In operation, metal disks 35 act as thermal conductors carrying the heat away from the center portion of the fuel cell thus reducing the temperature difference between central void 17 and cladding 10. It should be noted that the diameter of central hole 36 in metal disk 35 must be slightly larger than the outside diameter of conduit 14 in order to allow for fission product gases to pass by the barrier formed by disks 35 to reach central void 17. To facilitate migration of gas particles across metal disk 35, said disk may possess a plurality of perforations. In addition, because of the high temperatures encountered disks 35 must be fabricated out of a high temperature refractory metal such as tungsten, rhenium, molybdenum or the like or an alloy of same. The metal conductors or fins may be embedded in the fuel in any geometry which does not block bubble migration to the center. The use of the above thermally conductive devices will permit a higher emitter cladding surface temperature and thus greater thermionic conversion ability since the central portion can be operated at near melting temperature with a smaller temperature difference between the center of the fuel mass and the cladding. In both embodiments of this invention it is only necessary that fuel in the molten state not be near the vent hole 16 for long periods of time, i.e., one or more hours, to avoid plugging of the vent hole.

Although the foregoing embodiments have been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. A vented nuclear fuel element for use in a nuclear reactor, comprising a fissile fuel body, means defining a cladding surrounding and containing said fissile fuel body, a conduit penetrating said fissile fuel body and affixed and sealed to said cladding and having one end opening proximate the center of gravity of said fissile fuel body with distal end of said conduit opening outside said cladding for conduction of volatile and gaseous fission products away from said fissile fuel body.

2. The vented fuel element as defined in claim 1 wherein said fissile fuel body comprises a cylinder of compressed wafers of fissile fuel having a central hole and disks of thermally conductive refractory material having a central hole sandwiched between said wafers.

3. The vented fuel element as defined in claim 2 wherein said thermally conductive refractory material is selected from the group consisting of tungsten, molybdenum and rhenium and alloys thereof.

4. A thermionic nuclear fuel cell for use in a nuclear reactor comprising a fissile fuel body, an emitter cladding surrounding and containing said fissile fuel mass, a conduit penetrating said fissile fuel mass and affixed and sealed to said cladding and having an intake end comprising an end cap having a central hole of diameter smaller than the inside diameter of said conduit sealed and affixed to the end of said conduit proximate the center of gravity of said fissile fuel body with the end of said conduit distal said end cap opening to the exterior of said cladding for conduction of volatile and gaseous fission products away from said fissile fuel body.

5. A thermionic nuclear fuel element for use in a nuclear reactor, comprising a cylindriform fissile fuel body, a gas impervious cladding surrounding and containing said fissile fuel body, a conduit penetrating said fuel mass coincident with the longitudinal axis of said cylindriform fissile fuel mass and sealed and affixed to said cladding, an intake end of said conduit at the geometric center of said fuel body comprising an end cap having a central hole of diameter smaller than the inside diameter of said conduit, and an exit end of said conduit distal said intake end opening to the exterior of said cladding for conduction of volatile and gaseous fission products away from said fuel element.

* * * * *